No. 703,687. Patented July 1, 1902.
H. E. WARREN.
RELIEF VALVE FOR RESERVOIRS CONTAINING FLUID UNDER PRESSURE.
(Application filed Mar. 1, 1902.)
(No Model.) 2 Sheets—Sheet 1.

WITNESSES
R. L. Roberts.
A. L. Robinson.

INVENTOR
Henry E. Warren.

No. 703,687. Patented July 1, 1902.
H. E. WARREN.
RELIEF VALVE FOR RESERVOIRS CONTAINING FLUID UNDER PRESSURE.
(Application filed Mar. 1, 1902.)
(No Model.) 2 Sheets—Sheet 2.

Witnesses:
R. L. Roberts.
A. L. Robinson.

Inventor:
Henry E. Warren.

UNITED STATES PATENT OFFICE.

HENRY E. WARREN, OF NEWTON, MASSACHUSETTS, ASSIGNOR TO THE LOMBARD GOVERNOR COMPANY, OF BOSTON, MASSACHUSETTS, A CORPORATION OF NEW JERSEY.

RELIEF-VALVE FOR RESERVOIRS CONTAINING FLUID UNDER PRESSURE.

SPECIFICATION forming part of Letters Patent No. 703,687, dated July 1, 1902.

Application filed March 1, 1902. Serial No. 96,349. (No model.)

*To all whom it may concern:*

Be it known that I, HENRY E. WARREN, a citizen of the United States of America, residing at Newton, in the county of Middlesex and State of Massachusetts, have invented certain new and useful Improvements in Relief-Valves for Reservoirs Containing Fluid under Pressure, of which the following is a specification.

The improvements relate to valves more particularly intended to regulate and control the pressure of fluids in reservoirs or vessels in which there is liability of sudden increase of pressure caused by a rapid change in the amount of the flow of the fluid therefrom, particularly in the supply pipe or flume through which water is led to water-motors; and the invention consists in the improved construction of the devices and appliances which control and regulate the operation of such a relief-valve, whereby a rise in pressure in such reservoir beyond a given limit will cause said valve to open quickly and reduce the pressure of the fluid and then automatically close without oscillation. Certain forms of specific devices and appliances which I have found convenient for accomplishing this object are described and set forth in the following description and accompanying drawings, wherein—

Figure 1:
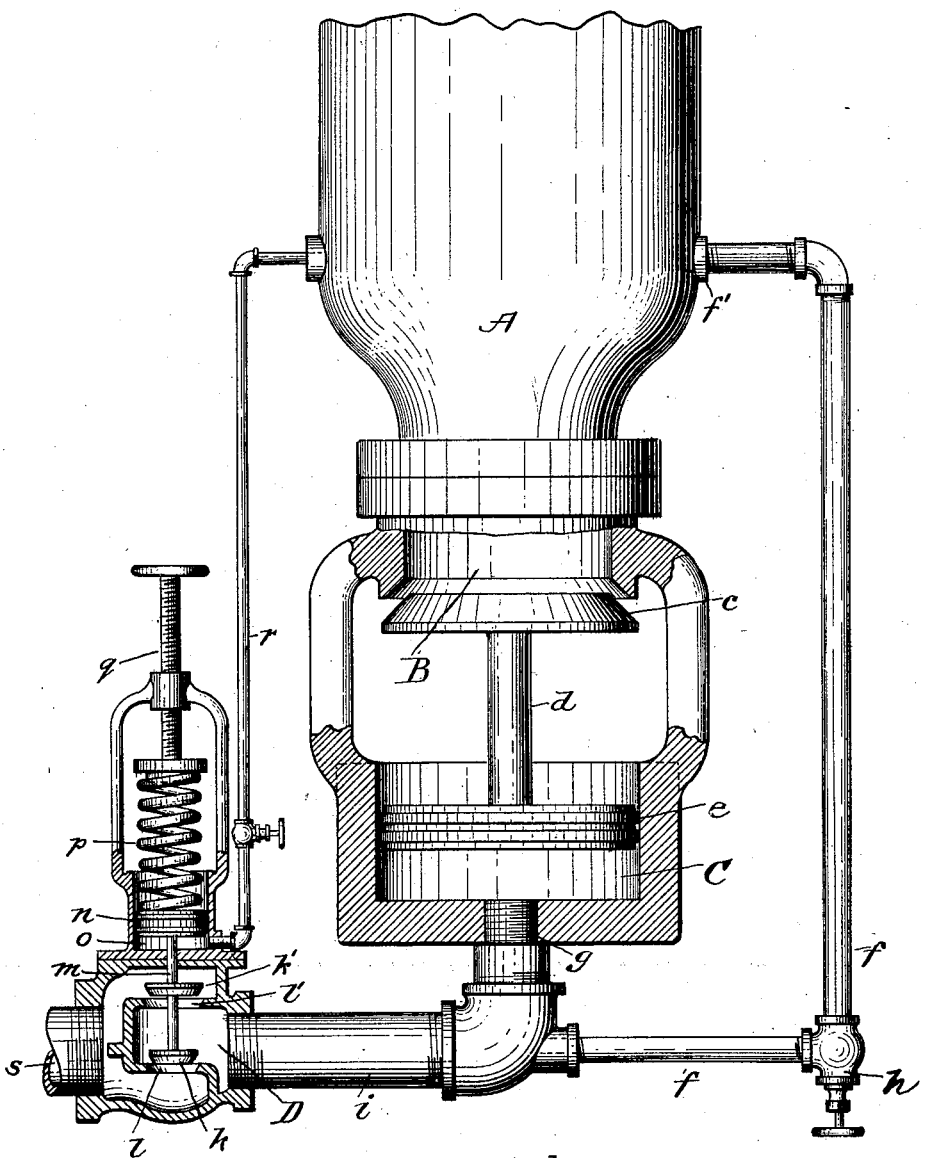
Figure 2:
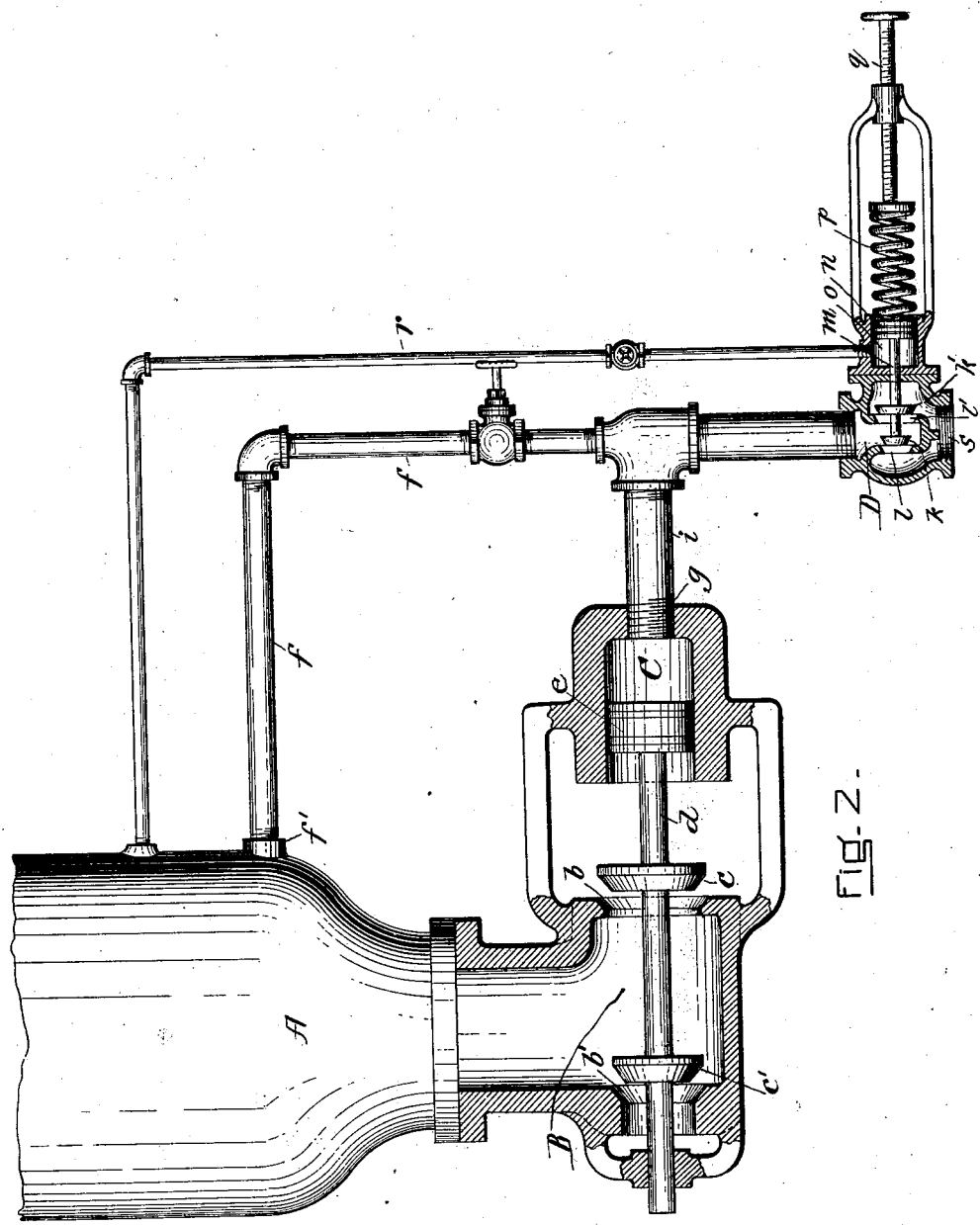

Figure 1 is an elevation of the end of such a fluid-containing reservoir with the relief-valve chamber and waste-valve chamber in section. Fig. 2 is a similar elevation in which a modification of the relief-valve is shown.

Referring to the drawings, A is the reservoir—for instance, the end of a pipe or flume from which water is supplied to water-motors.

B is the relief-valve chamber.

In Fig. 1 a single-seated valve is illustrated, which is closed by a disk $c$. $d$ is a rod attached to the disk $c$ and to a piston $e$, which reciprocates within a cylinder C. The diameter of the cylinder and piston $e$ is made somewhat larger than the disk $c$ to facilitate closing the valve. By means of a pipe $f$, which is connected to the reservoir A at $f'$, the fluid from the reservoir is conducted to the cylinder C through the opening $g$ in one end of said cylinder C. For the purpose of conveniently controlling the flow of the fluid through the pipe $f$ to the cylinder C, I provide a valve $h$, which may be used to change the size of an opening therein, and thus regulate the resistance to the flow of the fluid to the cylinder C, but still maintain a constant communication. The outlet of the cylinder C is also connected, by means of a pipe $i$, with a valve D, which I designate a "waste-valve." In the form illustrated in the drawing this waste-valve is of the type known as a "balanced" valve, having disks $k$ $k'$, which fit into corresponding seats $l$ $l'$. The stem $m$ of this valve is connected with a piston $n$ within a cylindrical chamber $o$, and a spring $p$ is provided to press against the outer side of the piston $n$, and by means of a screw $q$ the force of the pressure of the spring may be increased or diminished. The cylinder $o$ is connected, by means of a pipe $r$, with the reservoir A at a point therein where it is desired to regulate or limit the pressure of the fluid. Usually this point of connection should be near the relief-valve B. By this means the pressure of the fluid in the reservoir A acts upon the piston $n$ to raise it and open the valve D whenever such pressure is greater than the power of the spring $p$, which, as stated, can be regulated as desired. Any other convenient commercial form of pressure-operated mechanism may be used to operate the waste-valve in place of the form illustrated—such, for instance, as one or more diaphragms, the Bourdon curved tubes, or similar appliances. Other forms of valves than the balanced valve shown may also be employed as the waste-valve—such, for instance, as a common globe-valve operated by a piston or a diaphragm which has an area several times greater than the valve area—the essential thing being that the external force which tends to operate this valve shall be largely in excess of the force or pressure within the valve itself, which might tend to interfere with such operation. The valve D is furnished with a discharge-pipe $s$.

Preferably the pipe $i$, leading to the waste-valve D, should be made much larger than the pipe $f$, so that the water or other fluid may be discharged from the cylinder C more rapidly than it is supplied through the pipe $f$. In instances where it is not desired to change the rate of closing the valve B the pipe $f$ may be made of the proper size in relation to the cylinder C to produce the desired motion of the valve-disk $c$, and in that case the valve $h$ in pipe $f$ would be needed for no other purpose than to entirely shut off the supply of fluid through that pipe when desired; but under ordinary conditions the valve $h$ will be found of great convenience and utility, if not a necessary part of the apparatus.

In Fig. 2 there is illustrated a relief-valve which may be termed a "partially-balanced" valve, provided with outlets $b$ $b'$, which are respectively closed by disks $c$ $c'$, and upon which the fluid-pressure acts in opposite directions—namely, tending to close the disk $c'$ and to open the disk $c$. The disk $c$ being somewhat larger than the disk $c'$ the pressure of the fluid in the reservoir A tends constantly to open the relief-valve, and in order to keep this valve closed when the pressure in the reservoir is normal or at the predetermined limit (under which conditions the waste-valve D will be closed) the piston $e$ within the cylinder C needs an area only a minimum in excess of the difference in area between the disks $c$ and $c'$ to keep both of those valve-disks firmly seated.

The construction and operation of the other portions of the apparatus shown in Fig. 2 are the same as those of the apparatus shown in Fig. 1.

The operation of the apparatus when provided with my improvements is as follows: Assuming the pressure of fluid in the reservoir A to be below some predetermined limit, which I will designate as the "normal" pressure, for illustration referring to Fig. 1, the following conditions will exist: The waste-valve D will be closed, and therefore the fluid-pressure in the reservoir A and the cylinder C through the pipe $f$ will be in equilibrium; but since the area of the piston $e$ is greater than that of the valve-disk $c$ that disk will be held positively against its seat by a total pressure in pounds equal to the number of pounds per a given unit area multiplied by the difference in area between the disk $c$ and the piston $e$. The disks $k$ $k'$ of the waste-valve will be held to their seats by the force of the spring $p$, which is adjusted to equal the normal pressure desired, and consequently any pressure of the fluid in the cylinder $o$ communicated through the pipe $r$, which is less than the normal pressure, will not move the piston $n$, and therefore the valve D will remain closed. When there is a rise in the pressure in the reservoir A above the normal, it will be communicated through the pipe $r$ to the cylinder $o$, and thus raise the piston $n$, thereby compressing the spring $p$ and at the same time lifting the disks $k$ $k'$ from their seats and opening the valve D, thus furnishing an outlet for the fluid within the pipe $i$ and cylinder C. This operation will not wholly remove the pressure of fluid within the cylinder C, because there will still be a flow of liquid through the pipe $f$, which will tend to keep some fluid within the cylinder C; but its pressure will be decreased in proportion to the opening of the valve D, and the amount of movement of the disks of the valve D will depend upon the excess of pressure above the normal in the reservoir A, which acts upon said disks through the piston $n$. As soon as the pressure in the cylinder C is relieved the piston $e$ will be forced into that cylinder by the pressure of the fluid upon the disk $c$, thereby opening the valve B and immediately relieving the pressure in the reservoir A. As soon as the pressure in the reservoir A has been reduced to normal at the point where the pipe $r$ is connected therewith the pressure in the cylinder $o$ will be correspondingly reduced and the piston $n$ will be forced down by the spring $p$, thereby closing the waste-valve D, and immediately the fluid flowing through the pipe $f$ will fill the pipe $i$ and the space back of the piston $e$ in the cylinder C and then will gradually increase the pressure therein until the disk $c$ is forced back to its seat, thus closing the valve B and again producing an equilibrium in the whole system.

It should be observed that the amount of relief of pressure produced by the opening of the valve B at any time will depend upon the amount of increase in pressure above the normal within the reservoir A, for it is the amount of such increase in pressure above the normal which determines the extent of the opening of the waste-valve D and the consequent lowering of the pressure of fluid in the cylinder C. The period of continuance of any such increased pressure will depend upon the mass of fluid in motion, its velocity, rate of flow, and the suddenness with which it is checked. The speed with which the valve-disk $c$ returns to its seat after the waste-valve D has been closed will depend upon the size of the opening in the pipe $f$ or through the valve $h$, for the piston $e$ within the cylinder C will be moved through that cylinder only as fast as the fluid is forced in behind it. This action is one of the chief features of importance in my improvements, particularly when used in connection with long closed flumes or supply-conduits where the moving liquid, like water, has great inertia and where there is a tendency for periodic oscillations to be set up in this mass of liquid, and, as heretofore stated, by regulating the size of the pipe $f$ or the opening through the valve $h$ the relief-valve B may be made to close so slowly as to entirely obviate any ill effects from this tendency to oscillation in the fluid, and at the same time by means of the large waste-opening the valve B will open almost simultaneously with any increase in pressure above the normal within the reservoir. By opening the valve $h$ the speed with which the relief-valve B will be closed may be made as rapid as desired. Further, by operating the waste-valve independently by direct pressure of the fluid from the reservoir any increase of pressure therein above the normal will open this waste-valve, and thus cause the relief-valve B to be opened, even if the pipe $f$ should become clogged, and thus prevent any damage from an extreme excess of pressure within the reservoir, although the relief-valve B could not be closed again until the pipe $f$ had been freed and the fluid again allowed to flow into the cylinder C.

I claim—

1. In combination with a reservoir for fluid under pressure, a relief-valve which is connected with a piston operating within a cylinder, a fluid-conduit between this cylinder and said reservoir, and a waste-valve which communicates with the outlet of said piston-cylinder, and is operated by fluid-pressure directly from the reservoir and communicated thereto independently of the conduit to the piston-cylinder.

2. In combination with a reservoir for fluid under pressure, a relief-valve which is connected with a piston operating within a cylinder, a conduit between this cylinder and said reservoir which is adapted to regulate the flow of fluid to the cylinder, and a waste-valve which communicates with the outlet of said piston-cylinder, and is operated by direct fluid-pressure from the reservoir communicated independently of the conduit to said cylinder.

3. In combination with a reservoir containing fluid under pressure, a relief-valve controlled by a piston operating within a cylinder, a fluid-conduit between this cylinder and the said reservoir, means to regulate and maintain a resistance to the flow of fluid through said conduit which will reduce the fluid-pressure at its discharge, and a waste-valve which communicates with the outlet of said piston-cylinder and is operated by direct fluid-pressure from the reservoir communicated independently of the conduit to said cylinder.

4. In combination with a reservoir for fluid under pressure, a relief-valve adapted to be partially balanced by the fluid-pressure within itself, which valve is controlled by a piston operating within a cylinder, a fluid-conduit between this cylinder and said reservoir, means to regulate and maintain a resistance to the flow of fluid through said conduit which will reduce the fluid-pressure at its discharge, and a waste-valve in communication with the outlet of said piston-cylinder, which valve is independently operated by direct fluid-pressure from the reservoir independently communicated thereto.

5. In combination with a reservoir for fluid under pressure, a relief-valve constructed to be partially balanced by the fluid-pressure within itself, a cylinder containing a piston connected with said valve, the area of which piston is a minimum in excess of the area of the unbalanced portion of said valve, and a conduit from the cylinder to said reservoir to communicate the fluid-pressure therein to the piston in the cylinder, for the purpose described.

HENRY E. WARREN.

Witnesses:
ROBERT CUSHMAN,
REUBEN L. ROBERTS.